(12) United States Patent
Ahmed

(10) Patent No.: US 10,907,408 B2
(45) Date of Patent: Feb. 2, 2021

(54) SELF-POWERED DYNAMIC PHOTOVOLTAIC SUNSHADE

(71) Applicant: King Abdulaziz University, Jeddah (SA)

(72) Inventor: Khaled I. Nabil Ahmed, Jeddah (SA)

(73) Assignee: King Abdulaziz University, Jeddah (SA)

(*) Notice: Subject to any disclaimer, the term of this patent is extended or adjusted under 35 U.S.C. 154(b) by 218 days.

(21) Appl. No.: 16/209,214

(22) Filed: Dec. 4, 2018

(65) Prior Publication Data

US 2020/0173229 A1 Jun. 4, 2020

(51) Int. Cl.
 *E06B 9/24* (2006.01)
 *E06B 9/36* (2006.01)
 (Continued)

(52) U.S. Cl.
 CPC ............ *E06B 9/368* (2013.01); *H02S 20/32* (2014.12); *H02S 30/10* (2014.12); *H02S 40/32* (2014.12);
 (Continued)

(58) Field of Classification Search
 CPC .... E06B 2009/2476; E06B 9/36; E06B 9/368; E06B 9/00; E06B 9/24; E06B 2009/2423; E06B 2009/2447; E06B 2009/2452; E06B 9/367; H02S 20/00; H02S 20/22; H02S 20/30; H02S 30/10
 See application file for complete search history.

(56) References Cited

U.S. PATENT DOCUMENTS

| 5,258,076 A | 11/1993 | Wecker |
| 2011/0277809 A1 | 11/2011 | Dalland et al. |

(Continued)

FOREIGN PATENT DOCUMENTS

| CN | 105888504 A | 8/2016 |
| WO | 2017/052482 A1 | 3/2017 |

OTHER PUBLICATIONS

Coleman, et al. ; Solar Powered Window Blinds ; University of Central Florida ; Senior Design I Project ; Summer 2015 ; 136 Pages.

(Continued)

*Primary Examiner* — Katherine W Mitchell
*Assistant Examiner* — Jeremy C Ramsey
(74) *Attorney, Agent, or Firm* — Oblon, McClelland, Maier & Neustadt, L.L.P.

(57) ABSTRACT

A self-powered dynamic photovoltaic sunshade system having sunshades constructed of lightweight ETFE panels covered with at least one thin film of photovoltaic cells. The sunshades track the sun by light detectors, and move against the sun from east to west to block direct rays. The ETFE fabric is stretched on a lightweight frame, which rotates vertically around its axis as a pivotal panel for maximum solar protection. Sunshades rotate to face the sun by day, and reset to a starting position at night. Each sunshade is rotated by a stepped electric motor, powered by thin film(s) of solar photovoltaic cells. Sunshades are suspended between an electric motor shaft and a lower hinge. The sunshades are designed to provide sustainable dynamic shading for building facades exposed to different sun angles, are self-powered, and can generate electric power for other building functions, such as lighting and fan ventilation inside a building.

12 Claims, 11 Drawing Sheets

(51) Int. Cl.
*H02S 20/32* (2014.01)
*H02S 30/10* (2014.01)
*H02S 40/38* (2014.01)
*H02S 40/32* (2014.01)

(52) U.S. Cl.
CPC ...... *H02S 40/38* (2014.12); *E06B 2009/2458* (2013.01); *E06B 2009/2476* (2013.01)

(56) References Cited

U.S. PATENT DOCUMENTS

2015/0053252 A1 2/2015 Turina
2015/0101761 A1 4/2015 Moslehi et al.

OTHER PUBLICATIONS

Newark; Photo Light Dependent Resistors—LDR; Newark elementl 4; https://www.newark.com/c/optoelectronics-displays/photo-light-dependent-resistors-ldr; 2 Pages.
Sefar; PTFE Glass vs TENARA Fabric; https://www.sefar.mx/en/388/PTFE-Gass-vs-TENAARA-Fabric.htm?Atricle=2443749; 3 Pages.
Resistgard; Safelight Shields; Pun. No. 15-A340-0603; 2 Pages.
Omega; Air temperature RTD Probe with M12 Connector; https://omega.com/pptst/PR-25AP.html#description; 5 Pages.
Marian; DIY Solar Tracker System; Electro Schematics; https://www.electroschematics.com/8019/div-solar-tracher-system/; 9 Pages.
Newark; NSL 19M51.—Light Dependent Resistor, 550NM, TO-18; https://www.newark.com/advanced-photonix/nsl-19m51/light-dependent-resitor-550nm/dp/67C8925; 3 Pages.

SELF-POWERED DYNAMIC PHOTOVOLTAIC SUNSHADE

BACKGROUND

Technical Field

The present disclosure is directed to a self-powered dynamic photovoltaic sunshade system for shading the outside of window surfaces on a building façade. The sunshades hang vertically in front of the window. Each sunshade is configured to rotate in the direction of maximum solar energy to provide shading of the window. A self-powered dynamic photovoltaic sunshade system, method for controlling a self-powered dynamic photovoltaic sunshade system, and method for manufacturing a self-powered dynamic photovoltaic sunshade assembly are provided.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hot desert climates require shading windows of buildings from sun rays. This may be accomplished by use of sun screens and shading devices to reduce light during the day and to control the amount of direct sunlight entering through the windows. The path of the sun around the earth varies according to location, the time of day and season of the year. Southern, eastern, and western building facades are exposed to direct sun rays at different solar angles. Due to dynamic sun lighting, it is difficult to protect the building against sun in hot climates except by veiling the whole building with a costly sunscreen envelope. Some architects cover the building with heavy solar cells to achieve screening as well as generation of energy, which is costly and can be unsightly.

As solar cells have advanced to be lightweight and waterproof, flexible solar photovoltaic cells have recently become available for a variety of usages. For example, a flexible solar cell panel is available from PowerFilm, Inc., 1287 XE Place, Ames, Iowa, U.S. http://www.iowathinfilm.com/.

Flexible photovoltaic modules have been produced using thin-film amorphous silicon on a polymer substrate, which may be manufactured as long flexible strips. Such configurations may include a transparent upper conductor, an amorphous silicon layer doped to form a PiN junction, and a lower metal conductive layer all formed on a polymer substrate.

The flexible photovoltaic devices may include photovoltaic modules formed of amorphous silicon on a polymer substrate. The membrane may include a fabric substrate or support, which may be, for example, polyester vinyl or ethylene tetrafluoroethylene (ETFE).

These fabrics can be stretched on a frame to form a tensile structure onto which a photovoltaic device cell is mounted to form a photovoltaic module. Such lightweight photovoltaic modules have many uses as shading structures, which generate electricity to support lighting and other structural needs.

Dalland in US20110277809, incorporated herein by reference in its entirety, describes such a tensile structure including a horizontal frame. A plurality of membranes is provided, each membrane attached to the frame. A plurality of flexible photovoltaic devices is integrated with each of the membranes. The membranes can be of ETFE. Pockets may be added along the edges of the membrane to hold support cables and/or electrical wiring.

The photovoltaic cells produce direct current (DC) and may be joined in series and in pairs to provide increased voltage (i.e., the voltage of the pair connected in series is the sum of the voltage produced by each individual module). A pair of photovoltaic cells may produce, e.g., about 36 V open circuit and about 30 V at maximum power. Photovoltaic cells are connected in series to produce increased current. For example, the photovoltaic cells may be connected in series in pairs, and then two pairs may be connected in parallel.

Conventional flat solar arrays receive maximum solar energy when directed so that the array surface is normal to incident rays of the sun. Fixed arrays therefore are usually positioned to face due south (in the northern hemisphere) in order to receive the maximum amount of solar energy over the course of a day. The energy received by such an array varies as the sun traverses the sky, with the maximum energy absorption and generation occurring at noon. Similarly, a flat solar array should be tilted at a particular angle with respect to vertical in order to maximize the solar energy received over the course of a year, since the inclination of the sun's path changes seasonally. The optimum tilt angle for a flat array varies depending upon the latitude of the location of the array.

This present disclosure provides a sustainable economical solution to shading windows located on a building façade by self-powered dynamic photovoltaic sunshades, hung vertically in front of the windows. The sunshades are preferably made of lightweight ETFE (plastic polymers) fabric panels which track the sun by light detectors, and move against the sun to block direct rays. The ETFE fabric (or other fabric substrate or support) is stretched on a light frame, which rotates vertically around its axis as a pivotal panel for maximum solar protection. Each sunshades is rotated by an electric motor, powered by electric energy produced from a thin film of solar photovoltaic cells placed over or mounted on the fabric, substrate or support. Photovoltaic cells typically produce 12V power, which is used to rotate the sunshades during daylight and to preferably charge a battery. Panels have lightweight frame which rest on a hinge to allow smooth rotation.

It is one object of the present disclosure to provide sustainable dynamic shading for windows located on building facades exposed to different sun angles, that is self-powered, and can generate electric power for other building functions, such as lighting and fan ventilation.

SUMMARY

The present disclosure relates to a self-powered dynamic sunshade system which is installed on a building façade to shade a window in the façade. The sunshade assembly includes a plurality of sunshades and is configured to rotate each sunshade in the direction of maximum exposure to solar radiation. Photovoltaic cells covering each sunshade generate electricity which is used to operate an electric motor which rotates the sunshade. Light detectors installed on the sunshade provide output signals which are used by a control module to signal the motor to adjust the sunshade position.

In an exemplary embodiment, a self-powered dynamic sunshade system for covering or shading windows is provided. The automated sunshade system comprises a plurality of sunshades, each sunshade preferably constructed of a plastic polymer fabric stretched on a frame made from or consisting of two horizontal rods, a central vertical rod and two vertical cables. A plurality of thin film photovoltaic cells are adhered to the plastic polymer fabric.

Each sunshade is connected by a first rod to the shaft of an electric motor and at a second rod to a rotatable hinge stem. An electric motor is mounted on a first bar placed above and parallel to the first rod and the base of the rotatable hinge is connected to a second bar beneath and parallel to the second rod. The plurality of thin film photovoltaic cells provide current to the electric motor and further charge a storage battery in a control module.

Light detectors on either side of the first rod provide output signals to a controller in a control module, a comparator generates a comparison bit based on the output signals and the controller actuates a switch in the electric motor to turn the motor shaft based on the comparison.

In another exemplary embodiment, a method includes receiving current from the photovoltaic modules of each sunshade, the current charging a storage battery. A light detector is connected to either side of a rod which supports each sunshade. The light detector generates first output signals based on the degree of light sensed. A control module having a comparator and a controller receives the output signals from the light detectors and transmits the output signals to the inputs of the comparator. The comparator generates a comparison bit which is used by the controller to actuate a switch in an electric motor to turn the sunshade clockwise or counterclockwise, based on the difference between the light detector output signals. The control module continues to receive and compare the light detector output signals and to actuate a switch in the electric motor to rotate the sunshades until the difference between the light detector output signals is equal to zero. Each sunshade is attached to a separate electric motor and the wires carrying the output signals from the light detectors are received at separate inputs in the control module.

In an embodiment, a housing is provided for the light detectors. The housing is covered or coated with ultraviolet light shielding material. The housing further includes a wiper motor. The shaft of the wiper motor is inserted through a housing face, wherein the housing face is oriented parallel to the horizontal axis of the sunshade and directed to receive the incident rays of the sunlight. The wiper motor shaft holds a brush at a perpendicular orientation to the wiper motor shaft. The wiper motor includes wiring which is connected to the switch in the electric motor and actuates when the electric motor is actuated by the controller. The brush cleans the surface of the housing to keep the surface free from particulate matter. Additionally, the housing protects the delicate light detector from the elements and excessive ultraviolet radiation.

In an embodiment, the electric motor is a DC stepper motor. The controller may provide the control signal by sequential integer increments to actuate the DC stepper motor, thus rotating the sunshade in stepped increments.

In another embodiment, the control module includes an inverter for inverting the DC voltage of the battery to an AC voltage. The AC voltage is used to power the control module. The control module further includes a converter to adjust the voltages and currents to the magnitudes necessary to power the controller and other electronics. Additionally, the AC voltage may be provided to lighting and fans within the building when the difference between the output signals of the light detectors is zero.

In another exemplary embodiment, a method of manufacturing the automated sunshade assembly having a plurality of sunshades is disclosed. Each sunshade is constructed by adhering a stretched plastic polymer fabric to a frame consisting of first and second horizontal rods, preferably aluminum, and two guy wires connecting the two rods. A third rod, preferably aluminum, is attached between the centers of the first and second rods to form an "I" shaped structure. Guy wires or cables, of length L, are attached between the first and second end of the first rod and between the first and second end of the second rod.

The plastic polymer fabric has a width equal to the width of the horizontal rods and is stretched to a length equal to L.

Columns of thin film photovoltaic cells are then adhered to the stretched plastic polymer. The stretched plastic polymer fabric having columns of thin film solar cells is then adhered to the frame.

Light detectors are attached to either side of the first rod.

A first bar, preferably stainless steel, is provided. For each sunshade position, an electric motor is attached to the first bar with a suitable means, such as a pipe clip. The shaft of the electric motor is inserted into a hexagonal washer placed in the center of the first rod.

A second bar, preferably stainless steel, is provided. For each sunshade position, a rotatable hinge is installed on the second bar. The stem of the rotatable hinge is threaded through a hole in the center of the second rod and is inserted into the second end of the third rod.

The wiring of the photovoltaic cells connects to the electric motor and additional wiring extends from the electric motor to connect to the storage battery. Wiring carrying the output signals of the light detectors of each sunshade is connected to a control module. The control module includes a controller, converter, an inverter and a comparator.

The assembly is completed by attaching a plurality of sunshades to the electric motors and hinges of the second bars. The assembly is installed on a building façade to shade the outside of a window located on the façade.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
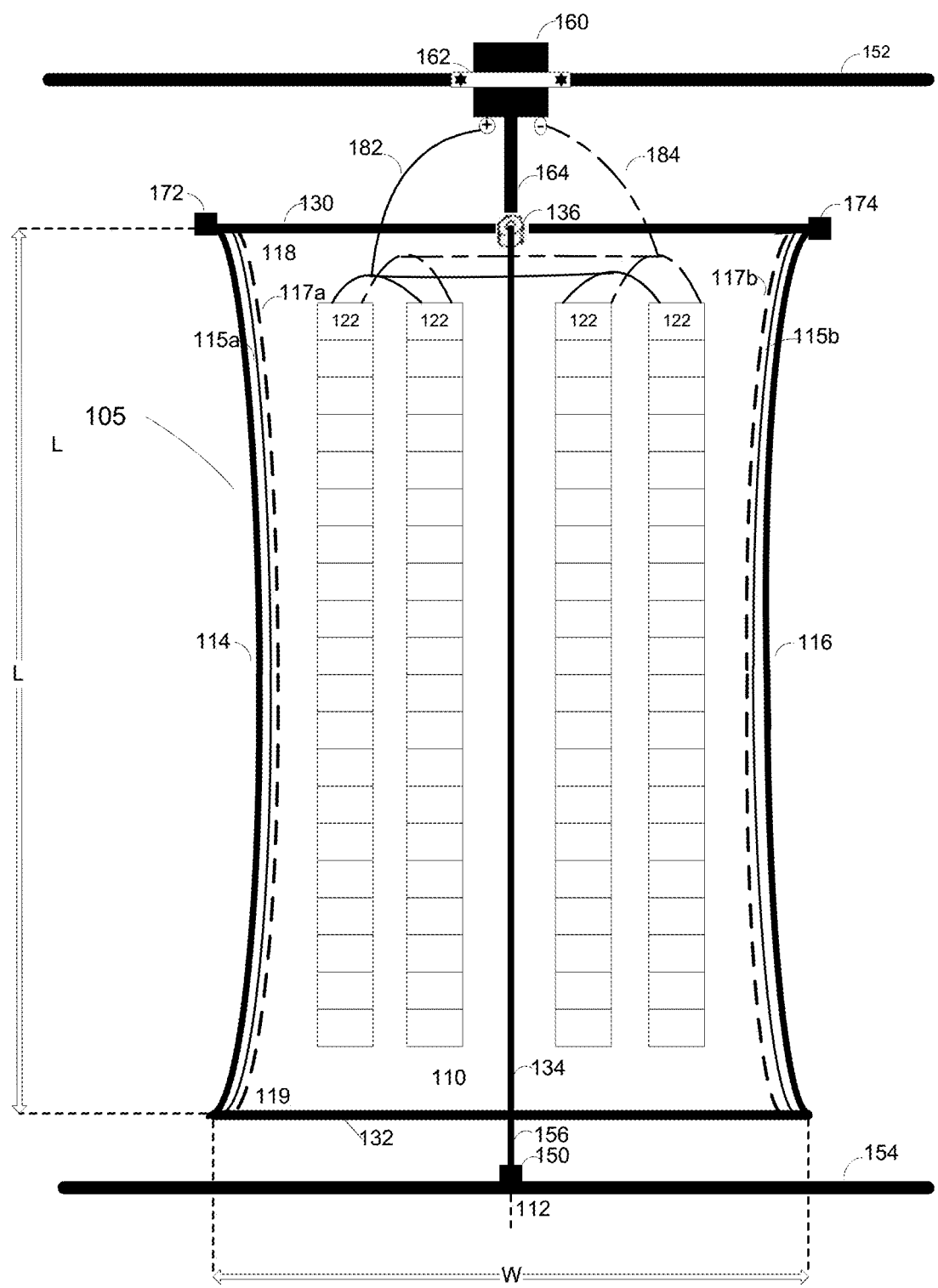
FIG. 1A is an illustration of a single automated photovoltaic sunshade, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Embodiments of the present disclosure are directed to a self-powered dynamic sunshade system, method for controlling a self-powered dynamic sunshade system and a method for manufacturing a self-powered dynamic sunshade assembly. The assembly is installed on a building façade to shade the outside of a window located on the façade. The self-powered dynamic sunshade system includes a plurality of sunshades and is configured to rotate each sunshade in the direction of maximum exposure to solar radiation. Photovoltaic cells covering one or more sunshades generate electricity which is used to operate an electric motor, preferably a DC motor, which rotates the sunshade. Light detectors installed on one or more sunshades provide output signals which are used by a control module to signal the motor to adjust the sunshade position. In another aspect, the generated electricity can be used to charge a storage battery. The battery energy can be inverted to provide AC current to power a control module. In a further aspect, the AC current can be used to power building lighting or fans.

Figure 1B:
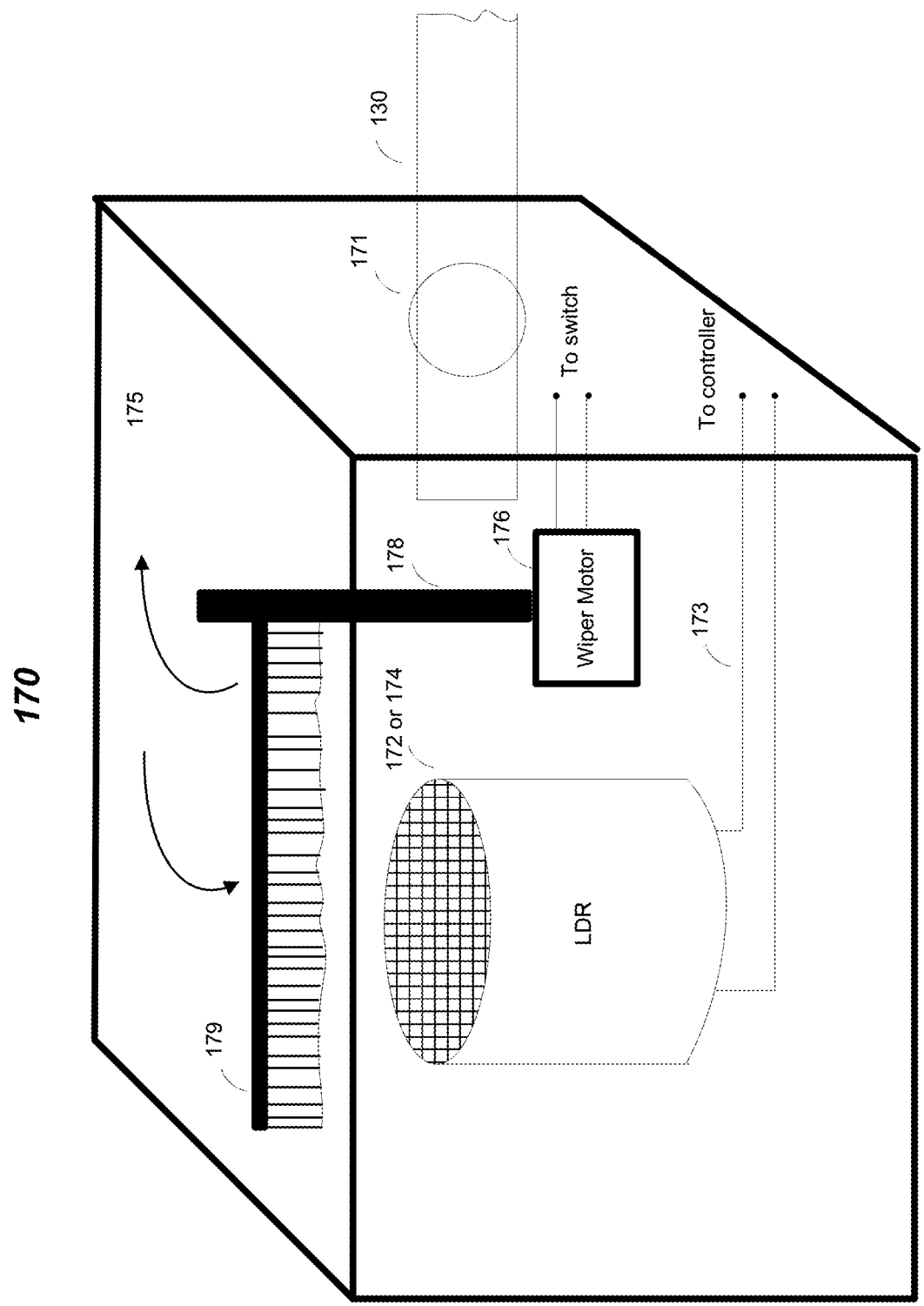
FIG. 1B is an illustration of a housing for a light detector, according to certain embodiments.
Figure 2:
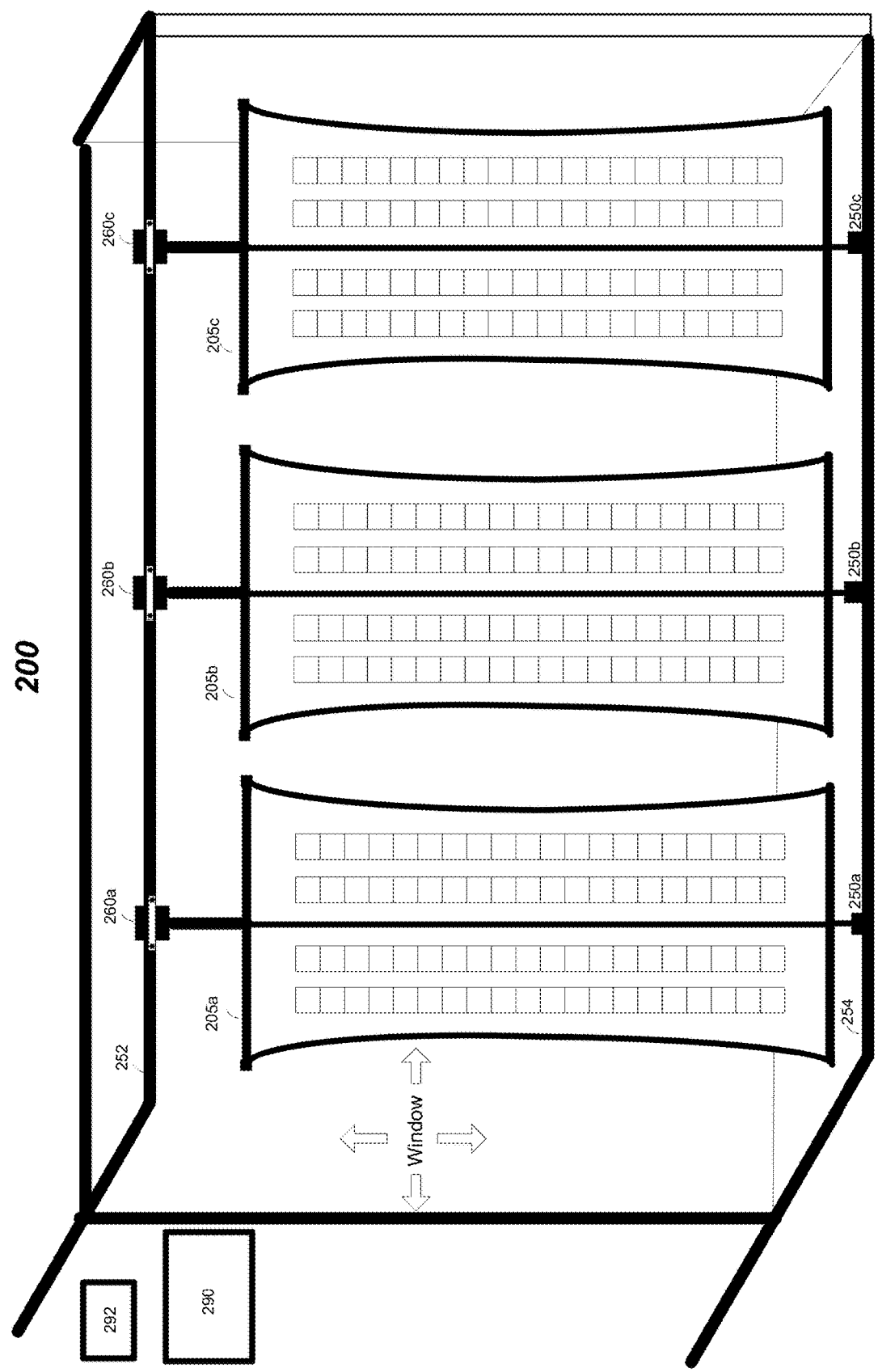
FIG. 2 is an illustration of a self-powered dynamic photovoltaic sunshade system having a plurality of sunshades, installed over a window in a building facade, according to certain embodiments.

FIG. 1A, FIG. 1B and FIG. 2 illustrate aspects of a first embodiment of a self-powered dynamic photovoltaic sunshade system for shading a window in a building facade.

As shown in FIG. 1A, a self-powered dynamic sunshade 105 is illustrated. The sunshade is preferably constructed of a plastic polymer fabric 110 having a flat front surface. As shown in FIG. 1A, the length of an exposed front surface of the plastic polymer fabric is depicted as L and the width is depicted as W. The plastic polymer fabric has a first end 118, a second end 119, a left edge 114, a right edge 116 and a central axis 112.

The plastic polymer fabric is preferably an ETFE fabric (ethylene tetrafluorethylene), which is durable, very light and can be patterned for shading purposes. In a non-limiting example, the ETFE fabric can be of the type manufactured by Birdair, Inc. 65 Lawrence Bell Drive Suite 100, Amherst, N.Y. 14221. http://www.birdair.com/tensile-architecture/membrane/etfe. However, the plastic polymer fabric can be any woven polymer fabric which is lightweight and has high tensile strength, such as the PTFE fiberglass, Tenara, sold by Sefar Inc. 111 Calumet Street, Buffalo, N.Y., USA, https://www.sefar.mx/en/388/PTFE-Glass-vs-TENARA-Fabric.htm?Article=2443749.

A first rod 130, preferably of aluminum, is placed perpendicular to the central axis 112, the first rod having a left end and a right end, wherein the width equals the width, W, of the plastic polymer fabric. A second rod 132 of width, W, is placed perpendicular to the central axis 112, the second rod having a left end and a right end.

A third rod 134, preferably of aluminum, is attached between the first and second rods along the central axis 112 and extends partially through the first rod and attaches to a hinge shaft inserted through the second rod 132. The third rod is cut to be equal to the desired length L between the first rod 130 and the second rod 132.

The first, second and third rods form a frame. Guy wires or cables, of length L, are attached between the first and second end of the first rod and between the first and second end of the second rod. The guy wires may be loosely attached to allow for later tightening of the frame. Alternatively, the guy wires may be attached to the ends of the first rod and inserted into pockets formed in the plastic polymer fabric when it is placed on the frame, then attached to the ends of the second rod.

The plastic polymer fabric may have a width, W, of 1 meter and an unstretched length of 1.5 meters. The plastic polymer fabric is stretched to the length L.

The plastic polymer fabric 110 is then stretched in the length direction, L. The plastic polymer fabric may be stretched up to twice its original length. For example, if the original length of the plastic polymer fabric is 1.5 meters, the stretched length may be up to 3 meters. The stretched length of the sunshade is designed to completely cover a vertical section of a window in a building façade. To achieve the proper length, the plastic polymer fabric may be unstretched, stretched to 1.25 times its original length, stretched to 1.5 times its original length or stretched to 1.75 times its original length. Additionally, the plastic polymer fabric may be stretched to 2.25 times or 2.5 times its original length, although the curvature of the sides becomes more extreme at these values. The plastic polymer fabric should not be stretched more than 2.5 times its original length, as it becomes too thin and may rupture if stretched to 3 times its original length. The stretched length of the polymer fabric should equal the length L of the third rod, preferably 3 meters.

Columns of thin film photovoltaic cells are then adhered to the stretched plastic polymer. The stretched plastic polymer fabric having columns of thin film solar cells is then adhered to the frame. A layer of transparent polymer plastic fabric may be laminated over the columns of thin film photovoltaic cells as a means for securing the cells as well as providing protection from the elements.

The stretched plastic polymer fabric having columns of thin film photovoltaic cells is attached at the first end to the first rod 130 and attached at the second end to the second rod 132. The means for attaching the plastic polymer fabric to the first and second rods can be any attachment means known in the art, such as gluing, stitching or riveting.

An optional first pocket 117a is formed in the left edge of the plastic polymer fabric, by gluing, stitching or any suitable means known in the art. A first guy wire 115a, having a first wire end and a second wire end, is inserted into the first pocket. The first wire end of the first guy wire is attached to the left end of the first rod 130, and the second wire end is attached to the left end of the second rod 132. Similarly, a second optional pocket 117b is formed in the right edge of the plastic polymer fabric and a second guy wire 115*b* having a first wire end and a second wire end is inserted into the second pocket. The first wire end of the second guy wire is attached to the right end of the first rod 130, and the second wire end of the second guy wire end is attached to the right end of the second rod 132.

In the preferred embodiment, the guy wires are inserted in pockets of the plastic polymer fabric. In order to attach the guy wires to the stretched plastic polymer fabric, the guy wires (115*a*, 115*b*) are fed into the pockets and loosely attached to the ends of the second rod. The guy wires are then tightened to support the width of the sunshade.

However, in alternate embodiments, the guy wires can be attached to the left and right edges of the fabric by any means known in the art, such as by threading through grommets or cable clips attached to the fabric.

In a further alternate embodiment, the guy wires may be attached to the ends of the first and second rods and tightened. The stretched polymer plastic fabric may then be applied to the frame. The left and right edges of the fabric may be wrapped around the guy wires and secured by gluing, riveting, or any securing means known in the art.

The first, second and third rods can be made of materials other than aluminum. For example, composite plastics, plastic lumber, fiberglass or lightweight wood can be used.

The plastic polymer fabric is covered at least partially by columns of thin film electrically connected photovoltaic cells (122), which are adhered to the plastic polymer fabric 110 after the fabric has been stretched as described above. As shown in FIG. 1A, four columns of photovoltaic cells are shown. However, the number of columns of photovoltaic cells is predicated by the size of the sunshade and weight considerations.

In a non-limiting example, the flexible photovoltaic modules are any of the types available from PowerFilm, Incorporated of Ames, Iowa (www.powerfilmsolar.com) and also from Solar Integrated Technologies of Los Angeles, Calif. (www.solarintegrated.com).

The columns of photovoltaic cells can be adhered to the plastic polymer fabric by any suitable means, such as by using an adhesive or laminating. Suitable adhesives are thermoplastics, pressure sensitive adhesives, polyethylene, ethylene acrylic acid (EAA) copolymer, polypropylene, acrylic PSA, silicone PSA, clear epoxy films, and various acrylics. Additional adhesives are ethylene vinyl acetate (EVA), an ionomer, or a polyolefin-based adhesive, silicones, silicone gels, epoxies, polydimethyl siloxane (PDMS), RTV rubbers, polyvinyl butyral (PVB), thermoplastic polyurethanes (TPU), and urethanes.

In a non-limiting example, the photovoltaic cells may be attached to the plastic polymer fabric 110 by using an adhesive, such as, for example, a thermal polyurethane adhesive, e.g., Bemis 5250 (from Bemis Associates Inc.), and/or a layer of epoxy, e.g., from Dow Chemical. If both a thermal polyurethane adhesive and an epoxy are used, the epoxy may be applied to the back of the photovoltaic cells, and the thermal polyurethane adhesive may be applied to the plastic polymer fabric.

In another non-limiting example, the photovoltaic cells may be laminated to the plastic polymer fabric. The lamination of photovoltaic cells onto plastic polymer fabric is discussed in "Flexible Photovoltaics for Fabric Structures" (AD Number: ADA392505, Corporate Author: Iowa Thin Film Technologies, Personal Author: Jeffrey, Frank, Report Date: Jun. 15, 2001; available at http://stinet.dtic.mil or at http://handle.dtic.mil/100.2/ADA392505), which is incorporated herein by reference in its entirety.

The automated sunshade system further comprises a first metal bar 152 proximate to and parallel to the first rod 130 and a second metal bar 154 proximate to and parallel to the second rod 132. The first and second metal bars are preferably constructed of stainless steel, which provides strength and corrosion resistance. However, the first and second metal bars can be made of any strong metal, such as carbon steel, tool steels, maraging steel, iron, titanium, tungsten or Inconel.

An electric motor 160, having a body and a shaft 164 extending perpendicular to the body, is attached to the first metal bar 152 so that the shaft 164 is parallel to the central axis 112. The electric motor 160 is secured to the first metal bar by a suitable securing means, such as a pipe clip 162, as shown in FIG. 1A, securing the electric motor to the metal bar 152 by screws.

The at least one thin film of electrically connected photovoltaic cells (122*a*, 122*b*, 122*c*, 122*d*) generates current from rays of the sun which impinge upon the photovoltaic cells. The positive wires 182 of the photovoltaic cells are connected together and connected to a positive connector on the electric motor. The negative wires 184 of the photovoltaic cells are connected together and connected to a negative connector on the electric motor The negative wires may be grounded. Current from the solar cells is used to power the electric motor 160 to rotate the sunshade.

The third rod 134 is connected at its first end to the electric motor shaft 134 through a hexagonal washer 136 inserted in the first rod 130 at the central axis 112. The third rod is connected at its second end to a hinge 150, which is connected to the second metal bar 154, by a hinge stem 156 which passes through a hole in the second rod 132 to connect into the end of the third rod 134.

A first light detector 172 is connected to the first end of the first rod 130 and a second light detector 174 is connected to the second end of the first rod 130. The light detectors are each configured to produce output signals when the light sensed is larger than a threshold value. Wiring 173 from the light detectors (172, 174) may be routed through the first rod 130, up to the first metal bar, and along the first metal bar to connect to control module inputs described below. The first metal bar may be a hollow tube for softer and better contact with the polymer fabric and/or have a C-shaped cross-section to hold the light detector and photovoltaic cell wiring.

In a non-limiting example, the light detectors may be of the type known as a light dependent resistor, or LDR. An LDR is also known as a photoresistor. An LDR is a component that has a variable resistance that changes with the light intensity which falls upon it. This allows use in light sensing circuits. The light detectors may be of the type NSL19M51, manufactured by Advanced Photonix, Newark element 14, 33190 Collection Center Drive, Chicago, Ill., U.S. https://www.newark.com/advanced-photonix/nsl-19m-51/light-dependent-resistor-550 nm/dp/67C8925.

In an alternative embodiment, heat sensors may be used in place of light detectors. Heat sensors are less costly, which may be a factor when many windows are covered with the sunshade system. In a non-limiting example, the heat sensors may be of the type PR-25AP, sold by Omega Engineering, Inc, 800 Connecticut Ave., Suite 5N0, Norwalk, Conn., U.S. https://www.omega.com/pptst/PR-25AP.html.

In an embodiment, a housing 170 is provided for the light detectors (172, 174). The housing is covered or coated with ultraviolet light shielding material. The housing further includes a wiper motor 176. The shaft 178 of the wiper motor is inserted through a housing face 175, wherein the housing face 175 is oriented parallel to the horizontal axis of the sunshade and directed to receive the incident rays of the sunlight. The wiper motor shaft 178 holds a brush 179 at an orientation perpendicular to the wiper motor shaft. The wiper motor includes wiring which is connected to the switch in the electric motor and actuates when the electric motor is actuated by the controller. The brush 179 cleans the surface of the housing face 175 to keep the surface free from particulate matter. Additionally, the housing protects the delicate light detector from the elements and excessive ultraviolet radiation.

Alternatively, the wiper motor wiring may be connected directly to the positive and negative wires of the nearest photocell 122. The housing may include a timing module (not shown), which actuates the wiper motor on a schedule.

In a non-limiting example, the ultraviolet light shielding material can be of the type available from IMTEC Acculine, 49036 Milmont Drive, Fremeont, Calif., U.S. https://www.imtecacculine.com/PDF/Resistgard_final.pdf The ultraviolet light shielding material protects the housing from all light of less than 520 nm wavelength.

As shown in FIG. 1A and FIG. 2, a controller 290 is operatively connected to a switch in the electric motor 260 and the light detectors (172, 174). The controller 290 includes circuitry configured to actuate the switch of the electric motor 260 to rotate the shaft bi-directionally through an angle of 180 degrees, based the difference between the output signals of the light detectors. For example, the sunshades may be have their horizontal axis oriented perpendicular to the face of the window at night, rotate in a clockwise direction to face the sunlight during the morning and afternoon hours, (the sunshades may have their horizontal axis parallel to the window at noon) and rotate in a counterclockwise direction when night falls. Alternatively, the sunshades may have their horizontal axis parallel to the window at night and rotate a full 180 degrees during the day as determined by the position of the sunlight, and rotate in a counterclockwise direction to return to the night position. The terms "clockwise" and "counterclockwise" are in no way limiting and are used as an example of the rotation for explanatory purposes.

In an aspect of the present disclosure, the electric motor may be a DC stepper motor wherein the controller actuates the DC stepper motor to rotate the shaft in equal step increments.

Referring again to FIG. 2, the first metal bar 252 and the second metal bar 254 are affixed to a building façade, and each sunshade 200 at least partially covers the outside surface of a window in the building façade. The first metal bar 252 is affixed parallel to and within the upper casement of the window in the situation where the casement extends outward from the window and there is clearance for the sunshade to rotate by 90 degrees. Alternatively, the first metal bar may be affixed to a framework on the building façade that provides clearance for the rotation of the sunshade. In the same manner, the second metal bar 254 is affixed within the lower casement or to a framework on the building façade.

A plurality of sunshades (205a, 205b, 205c) are shown installed on the metal bars. A plurality of electric motors (260a, 260b, 260c) are placed at intervals on the first metal bar 252. A plurality of hinges (250a, 250b, 250c) are placed at intervals on the second metal bar 254. The hinges may be inserted in a sliding track on the second metal bar for ease of adjusting the intervals. Although the sunshades (205a, 205b, 205c) are shown in FIG. 2 as three sunshades which are separated for clarity, the number of sunshades should be chosen so that the sunshades completely shade the window. The sunshades may overlap so that there is no gap between the sunshades when closed.

Referring to FIG. 1A and FIG. 2, a storage battery 292 is connected to the wiring (182, 184) of the at least one thin film of electrically connected photovoltaic cells (122a, 122b, 122c, 122d). The photovoltaic cells generate current from rays of the sun which impinge upon the photovoltaic cells, and the current from the photovoltaic cells is used to charge the storage battery 292. The DC voltage from the storage battery is inverted to provide AC current/voltage to power the controller 290.

Figure 3:
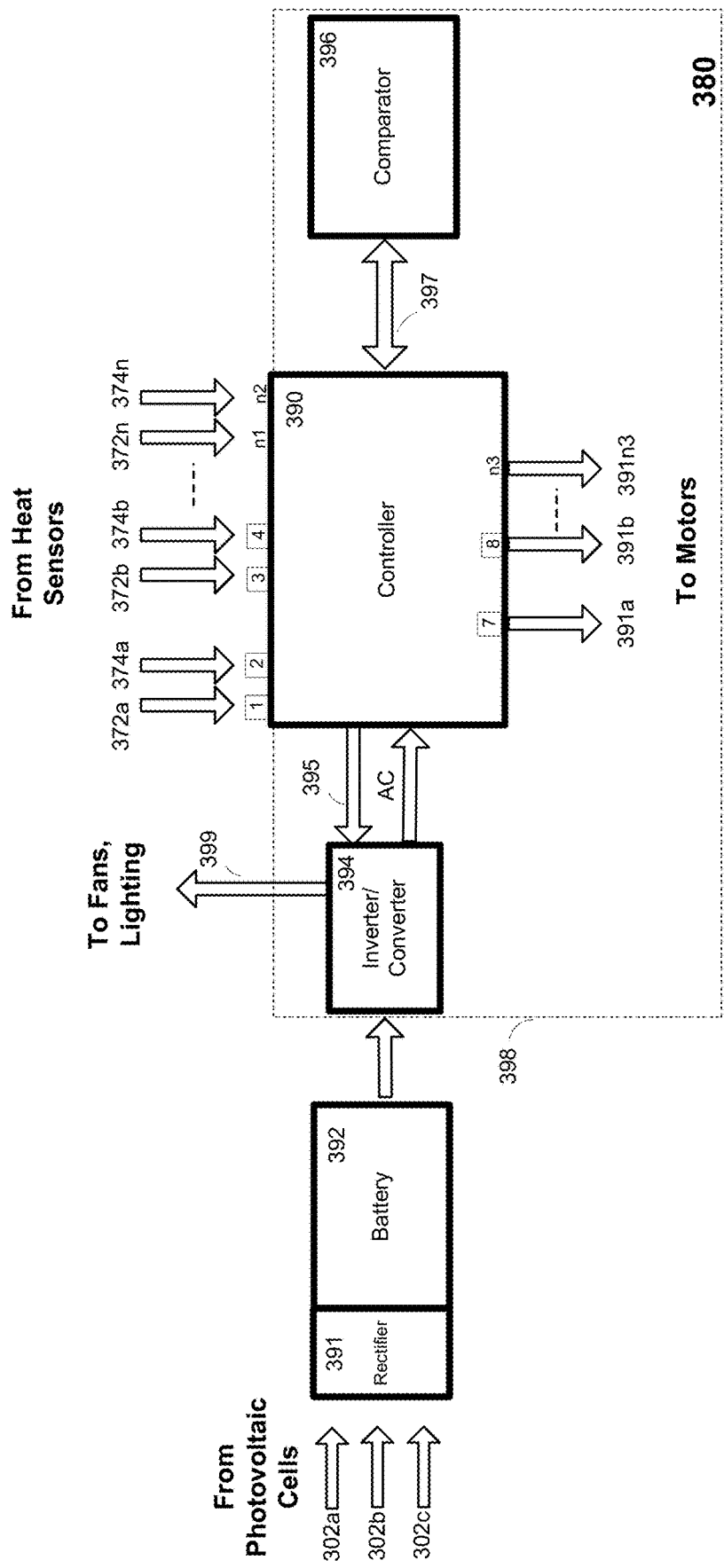
FIG. 3 is an exemplary illustration of a control module for a self-powered dynamic photovoltaic sunshade system, according to certain embodiments.

Referring now to FIG. 3, the controller 390 is shown operatively connected to an inverter/converter 394 and a comparator 396. The inverter 394 inverts the DC energy of the storage battery 392 to an AC current for powering the controller and the comparator. The converter circuitry may be used between the inverter 394 and the controller 390 to convert the AC current to the necessary current level required to power the controller, if the inverter output is not at the required level.

The controller 390 receives the output signals from the light detectors (172, 174) of each sunshade at the controller input pins (1, 2, 3, 4, . . . , n1, n2), where n=the number of sunshades. The controller transmits the output signals of the light detectors (172, 174) to the inputs of the comparator. The comparator compares the signals from the light detectors and provides a comparison bit to the controller (See Table 1). The controller then transmits a control signal (at pins 7, 8, . . . , n3) to the switch of the respective motor to actuate the motor associated with the respective light detectors when the absolute value of the difference between the signals is greater than a threshold value. For example, as shown in FIG. 2 and FIG. 3, light detector output signals (372a, 374a) received at input pins (1, 2) are processed by the controller. A control signal, based on the comparison of signals (372a, 374a), is sent at output pin 7 as 391a to the switch in electric motor 260a to actuate the motor to rotate sunshade 205a.

When the difference between the output of the light detector 172 is greater than the output of the light detector 174 and greater than a threshold value, the comparator outputs a control signal equal to one (1) to the controller. The controller will then actuate the switch in the electric motor to turn the sunshade in a clockwise motion. If the difference between the output of the light detector 172 is less than the output of the light detector 174 and the absolute value of the difference is greater than the threshold value, the comparator outputs a control signal equal to zero (0) to the controller. The controller will then actuate the switch in the electric motor to turn the sunshade in a counterclockwise motion. When neither light detector receives light, such as at night, the switch in the electric motor is actuated to turn the sunshade in a counterclockwise motion, to rotate back to its original 6 o'clock AM position, allowing the louvers to be in position for the next day's cycle. When there is no difference between the outputs of the light detectors, or when the absolute value of difference is less than the threshold amount, no control signal is output to the controller. In this situation, the controller will not send an actuating signal to the switch in the electric motor. The threshold value is a parameter of the comparator and is mentioned only to give clarity to the operation of the comparator.

TABLE 1

ACTUATION TABLE BASED ON THE DIFFERENCE
BETWEEN LIGHT DETECTOR OUTPUTS

| LIGHT DETECTOR OUTPUT DIFFERENCE (OUTPUT OF 172 MINUS OUTPUT OF 174) | COMPARISON BIT | ACTUATION SIGNAL |
|---|---|---|
| ZERO < DIFFERENCE > THRESHOLD | 1 | CLOCKWISE |
| ZERO < DIFFERENCE < THRESHOLD | NONE | NO ACTUATION |
| DIFFERENCE < ZERO ABS. DIFF. > THRESHOLD | 0 | COUNTERCLOCKWISE |
| DIFFERENCE < ZERO ABS. DIFF. < THRESHOLD | NONE | NO ACTUATION |
| DIFFERENCE = ZERO | NONE | NO ACTUATION |
| NO LIGHT RECEIVED | 1 | COUNTERCLOCKWISE TO RESET |

The controller has circuitry configured to iteratively check the light detector output signals and adjust the sunshade positions. However, the controller may optionally adjust the sunshade positions on a time schedule, for example once per hour, at noon when the sunlight impinges perpendicularly to the sunshade horizontal axis, in order to keep the battery fully charged. The controller should stop the control loop during certain times of the day, such as at night in order to save energy. Further, the controller may optionally only operate during certain days of the week or weeks of the year. The controller may optionally further be configured to provide an optional alarm when there is no detected output signal from one or more of the light detectors for a threshold amount of time, which could indicate a faulty component or could be used as a recommendation to turn off the automated sunshade system. The alarm may be shown on a display associated with the controller, or may be a sound alarm, such as a pinging noise or a siren. Alternatively, the alarm may be a flashing light on the controller.

FIG. 1A, 1B, 2, 3, 4 illustrate a second embodiment of the present disclosure, describing a method for controlling a self-powered dynamic photovoltaic sunshade system having a plurality of sunshades.

With reference to FIG. 1A, 1B, 2, 3, the method begins by receiving, at a storage battery 392, current(s) (302a, 302b, 302c) from the plurality of electrically thin films photovoltaic cells 122 adhered to each sunshade 105; charging the storage battery 392 using the currents; and receiving, at the controller 390, first two output signals from two light detectors (for example, 372a, 374a). The method continues by transmitting, by the controller, the first output signals to the respective inputs of the comparator 396. The controller is able to identify the left and right light detector signals by the respective input pin (1, 2, 3, 4, . . . n1, n2 where n equals the number of sunshades) to which each is connected. The controller has circuitry which identifies which electric motor is associated with the first two output signals from the two light detectors. (For example, as shown in FIG. 2 and FIG. 3, light detector output signals (372a, 374a) received at input pins (1, 2) are processed by the controller. A control signal, based on the comparison of signals (372a, 374a), is sent at output pin 7 as 391a to the switch in electric motor 260a to actuate the motor to rotate sunshade 205a). At the comparator, the method proceeds by comparing the first two output signals from the two light detectors (372a, 374a).

The method continues by the comparator 396 providing to the controller 390 a comparison bit of one or zero, as shown by Table 1, depending on the difference between the two output signals. When the two output signals are equal or when the absolute value of their difference is less than a threshold value, no comparison bit is provided to the controller. The threshold should be chosen to compensate for movement of the sunshades by wind, people touching the sunshades, etc. This will prevent the control loop from constantly switching the electric motor.

The controller, upon receiving a comparison bit of one or zero, identifies the electric motor 260a associated with the light detectors, and transmits a control signal 391a from controller output 7 for actuating a first DC electric motor (260a) associated with the first sunshade to rotate a first motor shaft 164 in a clockwise direction when the difference between the first output signals is greater than zero, or transmits the control signal 391a for actuating the electric motor to rotate the first motor shaft in a counterclockwise direction when the difference between the first output signals is less than zero. The current for rotating the first DC electric motor is provided by the photovoltaic cells. When the difference between the output signals of the light detectors is zero, the comparator does not transmit a comparison bit, thus the controller does not transmit a control signal 391.

The controller continues receiving output signals from the two light detectors (372a, 374a), comparing the signals and transmitting control signals 391a to the motor 260a, and rotating the first sunshade until the difference between the first output signals is equal to zero. Although the controller may continuously compare the output signals, it is preferred that the output signals from the light detectors are checked at time intervals, for example, once per hour, in order to keep the battery fully charged.

The controller may optionally stop the control loop during certain times of the day, such as at night in order to save energy. Further, the controller may optionally only operate during certain days of the week or weeks of the year, or stop operating if the wind velocity is greater than 10 km/hr, for example. The controller may further return the sunshades to a reset position at certain times of the day, such as at night. The reset position may be one where all the sunshades have one of the ends of the horizontal rods perpendicular to the surface of the window. The reset position may be one where all the sunshades have one of the ends of the horizontal rods parallel to the surface of the window. The reset position may be one where all the sunshades have one of the ends of the horizontal rods make an angle of 45 degrees with the surface of the window. The certain time of the day may be any of 12 AM, 6 AM, 12 PM, 3 PM, 6 PM and 9 PM.

The controller may optionally further be configured to provide an optional alarm when there is no detected output signal from one or more of the light detectors for a threshold amount of time, which could indicate a faulty component or could be used as a recommendation to turn off the automated sunshade system.

The method continues by the controller receiving output signals from each pair of light detectors of each sunshade in sequence and comparing the two output signals associated with each sunshade by the comparator. The control process continues by the controller receiving the comparison bit from the comparator and transmitting a control signal 391 for actuating the electric motor in either a clockwise or a counterclockwise direction. When the difference between the output signals of the pair of light detectors is zero, the controller does not transmit a control signal 391.

As disclosed in the first embodiment, the electric motor 260 is preferably a stepper motor, the controller providing the control signal 391 by sequential integer increments to actuate the electric motor associated with the first sunshade to rotate a motor shaft in a stepped clockwise direction when the difference between the first output signals is greater than zero, or providing the control signal 391 by sequential integer increments to actuate the electric motor 260 associated with the first sunshade to rotate the motor shaft in a stepped counterclockwise direction when the difference between the first output signals is less than zero, comparing the output signals from the two light detectors associated with the first sunshade after each step; and continuing the stepped rotating and comparing until the difference between the output signals is equal to zero.

The method includes using the DC energy of the storage battery to power the controller and comparator by inverting the DC voltage of the storage battery to an AC current. The AC current may be further input to a converter to step down or step up the AC current to an amplitude usable for powering the controller and comparator.

In a further embodiment, the method may include the controller having a control algorithm for monitoring the battery charge. If the battery charge exceeds a predetermined level, the battery is in danger of overheating. In this situation, the controller may connect building lighting, fans or other electronics to the AC current supplied by the inverter in order to drain off some of the charge on the battery. The controller may also provide the battery voltage or AC voltage to lighting and fans within the building when the difference between the output signals of the light detectors is equal to zero for all of the sunshades of the plurality of sunshades.

FIG. 1A, 1B, 2, 3, 4 illustrate wherein the method includes controlling a self-powered dynamic photovoltaic sunshade system having a plurality of sunshades installed on a building facade, wherein the plurality of sunshades completely cover the window in the building façade when the sunshade width is parallel to the window.

The method further includes inverting, with inverter 394, the storage battery 392 voltage to an AC current to power the controller; receiving, by the controller 390, the output signals from the light detectors of each sunshade at controller inputs (1, 2, 3, 4, . . . n1, n2), transmitting, with the controller, the output signals to a comparator 396, comparing, at the comparator 396, the output signals from the light detectors of each sunshade to generate comparison bits based on the difference between the two signals. The method continues by the controller receiving the comparison bits from the comparator and transmitting an actuating signal (391a, 391b, . . . , 391n) to the switch of the electric motor 390 of the associated with the light detector output signals, therefore controlling each DC electric motor independently of the other sunshades. For example, referring to FIG. 3, for a first sunshade having light detector output signals 372a and 372b, received by the controller at pins 1 and 2 respectively, the controller outputs the control signal 391a from pin 7. The method includes powering the electric motor 260 of each sunshade, using energy from the photovoltaic cells associated with the sunshade.

FIG. 1A, 1B, 2, 3 illustrate a method for manufacturing a self-powered dynamic photovoltaic sunshade assembly having a plurality of sunshades. The method begins by detailing the constructing of each sunshade 105 of the plurality of sunshades.

Firstly, providing a flat section of plastic polymer fabric 110 of length (L) and width (W); providing a first aluminum rod 130 of the same width, W, as the width of the plastic polymer fabric; providing a second aluminum rod of the same width, W, as the width of the first rod; drilling a hole in the center of the first aluminum rod 130, the hole sized to hold a hexagonal washer 136. For the second aluminum rod, 132, drilling a hole in the center, the hole sized to receive the shaft 156 of a rotatable hinge 150. The method continues by providing a first metal bar 152, preferably of stainless steel, of width (BW) equal to the width of a window in a building façade; dividing BW by W to determine the number N of sunshades to manufacture, wherein N is rounded down to an integer value, and providing N pieces of plastic polymer fabric of length L and width W, N aluminum first rods of width W, N aluminum second rods of width W, N rotatable hinges and N hexagonal washers.

The method of manufacture continues by inserting a first hexagonal washer 136 into the hole in the first aluminum rod 130 and inserting a first end of the third aluminum rod into the hole in the first aluminum rod 130 to contact the hexagonal washer 136; providing a second metal bar 154 of width (BW) and inserting hinges 150 into the metal bar at intervals corresponding to the position of the second ends of the third aluminum rod 134 of each of the N sunshades, wherein the intervals are evenly distributed across the width BW of the second metal bar as shown in FIG. 2; inserting the rotatable stem 156 of a first hinge 150 in the hole in the second aluminum rod 132 and attaching the rotatable stem 156 of the first hinge into the second end of the third aluminum rod 134.

The method of manufacture continues by attaching guy wires or cables, of length L+20 cm, between the first and second end of the first rod and between the first and second end of the second rod. The method entails attaching a first end of the first guy wire 115a to the left end of the second aluminum rod 132; attaching a first end of the second guy wire 115b to the right end of the second aluminum rod 132; attaching a second end of the first guy wire 115a to the left end of the second aluminum rod 132; and attaching a second end of the second guy wire 115b to the right end of the second aluminum rod 132.

The extra 20 cm length allows an extra 10 cm at each end of the wire for securing the guy wire to the first or second rod. The guy wires may be loosely attached to allow for later tightening of the frame. Any excess length will be cut off after attaching the stretched plastic polymer fabric.

Alternatively, the guy wires may be attached to the ends of the first rod and inserted into pockets formed in the plastic polymer fabric when it is placed on the frame, then attached to the ends of the second rod.

The guy wires can be attached to the aluminum rods 130 and 132 by any means known in the art, including tying the guy wires to the rods, inserting the guy wire end into a hole at the end of the rod and twisting the end of the guy wire. Alternatively, a connector can be used to securely attach the guy wire to the rod end.

The finished sunshade body is made of plastic polymer fabric stretched over the lightweight frame comprised of the three aluminum rods and the two guy wires as described below.

The method of manufacture further continues by stretching the polymer plastic in the length direction to a finished length equal to L as shown in FIG. 1A.

The plastic polymer fabric is preferably ETFE fabric, which ruptures at 300% of its original length or width, therefore the upper limit for stretching in the length direction is set to be twice its original length. If the original length of the fabric is 1.5 m, the stretched length will be 3 meters. When assembled, the guy wires will secure the fabric in the width direction to provide a lightweight frame of 3 meters long and approximately 1 meter in width, where the fabric is under tension on the frame. The center width is less than the width attached to the first and second rods, due to the stretching in the length direction (See FIG. 1A).

To achieve a desired length, the plastic polymer fabric may be unstretched, stretched to 1.25 times its original length, stretched to 1.5 times its original length or stretched to 1.75 times its original length. Additionally, the plastic polymer fabric may be stretched to 2.25 times or 2.5 times its original length, although the curvature of the sides becomes more extreme at these values. The plastic polymer fabric should not be stretched more than 2.5 times its original length, as it becomes too thin and may rupture if stretched to 3 times its original length.

Stretching may be done by hand or by using a stretching frame (not shown).

The method of manufacture continues by measuring the width of the stretched plastic polymer fabric at the center of the length to determine a stretched width SW (note that this width is smaller than the original width W, due to the aforementioned stretching); providing a column of thin film photovoltaic cells 122 of width PW; dividing SW by PW to determine the number of columns of thin film photovoltaic cells 122 which can be applied to the stretched plastic polymer fabric, wherein the number of columns is an even integer value.

The method of assembly continues by adhering columns of thin film photovoltaic cells 122 to the stretched plastic polymer fabric parallel to the length direction. A layer of transparent polymer plastic fabric may be laminated over the columns of thin film photovoltaic cells as a means for securing the cells as well as providing protection from the elements.

The method of assembly proceeds by attaching the stretched plastic polymer fabric having columns of thin film solar cells to the frame made by the first, second and third rods and the guy wires. The stretched plastic polymer fabric having columns of thin film photovoltaic cells is attached by adhering the plastic polymer fabric 110 at a first end of the length to the first aluminum rod 130; adhering the plastic polymer fabric at a second end of the length to the second aluminum rod 132.

The assembly continues by further attaching the stretched polymer fabric to the third rod 134. The means for attaching the plastic polymer fabric to the first and second rods can be any attachment means known in the art, such as gluing, stitching or riveting.

The method of assembly proceeds by attaching the stretched the plastic polymer fabric to the guy wires by folding the left width 114 of the stretched plastic polymer fabric around the first guy wire to create a left pocket 117*a* and folding the right width 116 of the stretched plastic polymer fabric to create a right pocket 117*b*, tightening the guy wires and cutting off excess length of the guy wires.

Optionally, a first pocket 117*a* may be formed in the left edge of the plastic polymer fabric, by gluing, stitching or any suitable means known in the art. In this embodiment, the second end of the first guy wire 115*a* is not attached to the second rod, but is inserted into the first pocket. The second wire end is then attached to the left end of the second rod 132 and tightened. Similarly, a second optional pocket 117*b* is formed in the right edge of the plastic polymer fabric and a second guy wire 115*b* having a first wire end and a second wire end is inserted into the second pocket. The first wire end of the second guy wire is attached to the right end of the first rod 130, and the second wire end of the second guy wire end is attached to the right end of the second rod 132 and tightened to support the width of the sunshade. The left and right edges of the fabric may be wrapped around the guy wires and secured by gluing, riveting, or any securing means known in the art.

In the preferred embodiment as shown above, the stretched polymer fabric is formed around the guy wires. However, in alternate embodiments, the guy wires can be attached to the left and right edges of the fabric by any means known in the art, such as by threading through grommets or cable clips attached to the fabric.

After each sunshade 105 is assembled, the sunshade 105 is attached to an electric motor shaft, where the electric motor is fastened to the first metal bar 152. Included in the method of manufacturing, and as illustrated in FIG. 1A and FIG. 2, are providing an electric motor 160 for each of the sunshades; attaching the electric motor to the first metal bar 152 at a first interval corresponding to the axis 112 of each of the sunshades 105; positioning a shaft 164 of each DC electric motor into the hexagonal washer 136 of the each third aluminum rod 134; inserting the shaft of the electric motor into the third rod.

The photovoltaic cells 122 are connected to DC electric motor contacts ((+), (−)) by twisting the positive wires 182 of the columns of thin film photovoltaic cells together and connecting to a positive contact (+) on the electric motor 160 and twisting the negative wires 184 of the columns of thin film photovoltaic cells 122 together and connecting to a negative contact (−) on the electric motor Additional wiring connects the electric motor contacts ((+), (−)) to a storage battery 392. This wiring (not shown) may be routed along the first metal bar or inside the first metal bar if the first metal bar is a hollow tube or has a cross section which is C-shaped.

Two light detectors (172, 174) are provided for each sunshade 105. The method of manufacture continues by attaching a first light detector 172 to the left end of the first aluminum rod 130; attaching a second light detector 174 to the right end of the first aluminum rod 130. As discussed with respect to the first embodiment, the wiring (not shown) of the light detectors may be routed through the first rod 130, up to the first metal bar, and along the first metal bar to connect to input pins (1, 2, 3, 4, . . . , n) of controller 290. The first metal bar may be hollow or have a C-shaped cross-section to hold the light detector and photovoltaic cell wiring.

In an embodiment, the method includes providing a housing 170 for the light detectors (172, 174), and covering or coating the housing with ultraviolet light shielding material. The housing further including a wiper motor 176 and inserting the shaft 178 of the wiper motor through a housing face 175, wherein the housing face 175 is oriented parallel to the horizontal axis of the sunshade and directed to receive the incident rays of the sunlight. The wiper motor shaft 178 is configured for holding a brush 179 at an orientation perpendicular to the wiper motor shaft. The wiper motor includes wiring, and the method continues by connecting the wiring to the switch in the electric motor such that the wiper motor actuates when the electric motor is actuated by the controller. Actuating the switch causes the brush 179 to rotate, thereby cleaning the surface of the housing face 175 to keep the surface free from particulate matter. Additionally, the housing protects the delicate light detector from the elements and excessive ultraviolet radiation.

Alternatively, the wiper motor wiring may be connected directly to the positive and negative wires of the nearest photocell 122. The housing may include a timing module (not shown), which actuates the wiper motor on a schedule. The ultraviolet light shielding material protects the housing from all light of less than 520 nm wavelength.

The method of manufacturing continues by assembling the automated photovoltaic sunshade system by installing N DC electric motors on the first stainless steel bar 152, such that the shafts 164 of the electric motors 160 are aligned in the length direction with stems 156 of the hinges 150 on the second stainless steel bar 154; attaching each of the N sunshades to the shaft 164 of a corresponding DC electric motor 160; attaching the second ends of each of the third aluminum rods 134 to a corresponding hinge stem 156; connecting the wires of the photovoltaic cells 122 of each of the N sunshades 105 to the corresponding DC electric motor 160; and connecting, using wiring, the controller 290 to a switch in each of the electric motors. Power for the electric motor 160 is provided by the photovoltaic cells 122 under actuation of a switch within the electric motor. A control signal 391 actuates the switch, thus connecting either the positive pole of the electric motor or the negative pole of the electric motor. A third pole is connected to ground. Connecting the switch to the positive pole and ground actuates the electric motor to rotate the shaft 164 in a clockwise direction. Connecting the switch to the negative pole and ground actuates the electric motor to rotate the shaft 164 in a counterclockwise direction.

As shown in FIG. 3, a control module 380 including a controller 390, an inverter/converter 394, and a comparator 396 are included in the automated sunshade system. A storage battery 392 is connected to the wires from the photovoltaic cells 122 to receive the current(s) 302 from each of the photovoltaic cells 122. As shown in FIG. 3, the battery may include or be connected to an optional rectifier 391 to smooth any noise from the photovoltaic cell current. The storage battery 392, optional rectifier 391 and the control module 380 are installed near the window on the interior of the building for protection from the elements.

The method of manufacture continues by connecting the wires of the light detectors (372a, 374a, 372b, 374b, 372c, 374c) of each of the N sunshades to separate input pins (1, 2, 3, 4, . . . , n), where n is the number of sunshades, of the controller. The controller is operatively connected to the comparator 396 in order to transmit the output signals to the comparator 396 and receive a comparison bit. As mentioned above, the controller 390 outputs a signal (391a, 391b, . . . , 391n) at pins (7, 8, . . . , n3) connected by wiring to a respective switch in each electric motor (260a, 260b, . . . , 260n) to actuate the electric motor to rotate the sunshade based on the light detector output signals.

The controller may also be connected bidirectionally to the inverter, so as to transmit a signal 395 to switch the inverter to provide electricity 399 to building electronics, such as lighting and fans.

Further, although not explicitly shown, the control module 380 may be remotely controlled. The control module may include a display having indicator lights to alert the user of the status of the control. The control module may include an audible alarm to indicate fault conditions. Additionally, the controller 390 circuitry further includes a computing device having hardware and software in order to accomplish the controlling described above.

Figure 4:
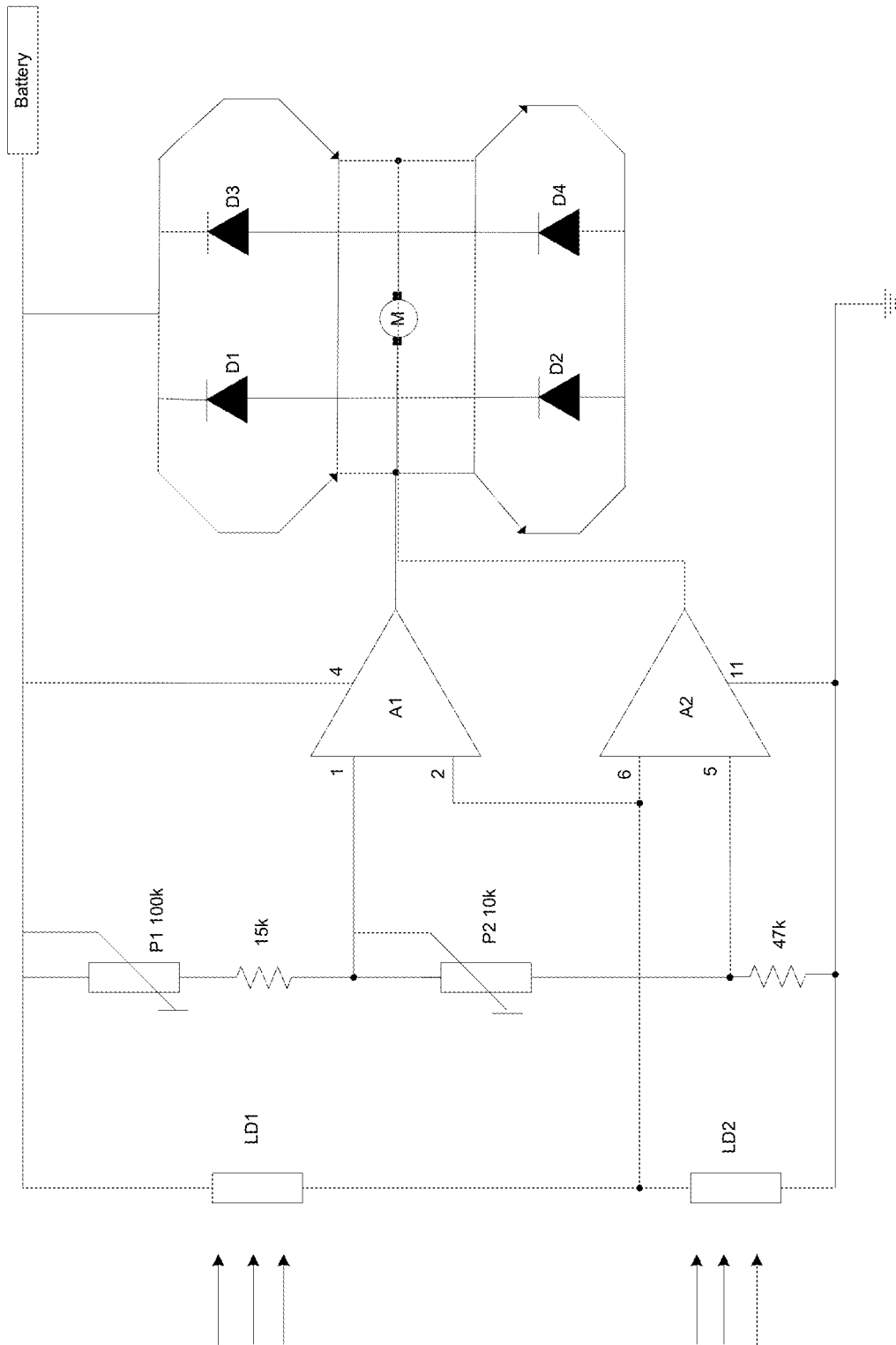
FIG. 4 is an exemplary illustration of a comparator, according to certain embodiments.

FIG. 4 illustrates a comparator 496 which may be used as the comparator 396 of FIG. 3. The control module 300 uses the comparator to maintain the motor in an idle state as long as the two light detectors of a sunshade are under the same illumination level. In this case, half of the voltage is applied to the noninverting input of A1 and half of the voltage is applied to the inverting input of A1. When the sun position changes, so does the illumination level on the light detectors. In this situation, the input voltage for the comparator is no longer half of the supply voltage thereby the output of the comparator generates a comparison bit used by the motor that rotates the sunshade for tracking the sun. P1 and P2 are variable resistors adjusted in such way that the motor stands still when the light detectors receive the same amount of solar light. If less light reaches 174 than 172, the voltage in point A increases to more than half of the power supply voltage. As a result the output of A1 is HIGH and T1 and T4 transistors conduct, which starts the electric motor. If the angle of the solar light is changes and the voltage in point A decreases to less than power supply voltage, the output of A2 goes HIGH and T3 and T2 transistors conduct. As a result the electric motor rotates in the opposite direction. (See Electroschematics, https://www.electroschematics.com/8019/diy-solar-tracker-system/, incorporated herein by reference in its entirety).

Figure 5A:
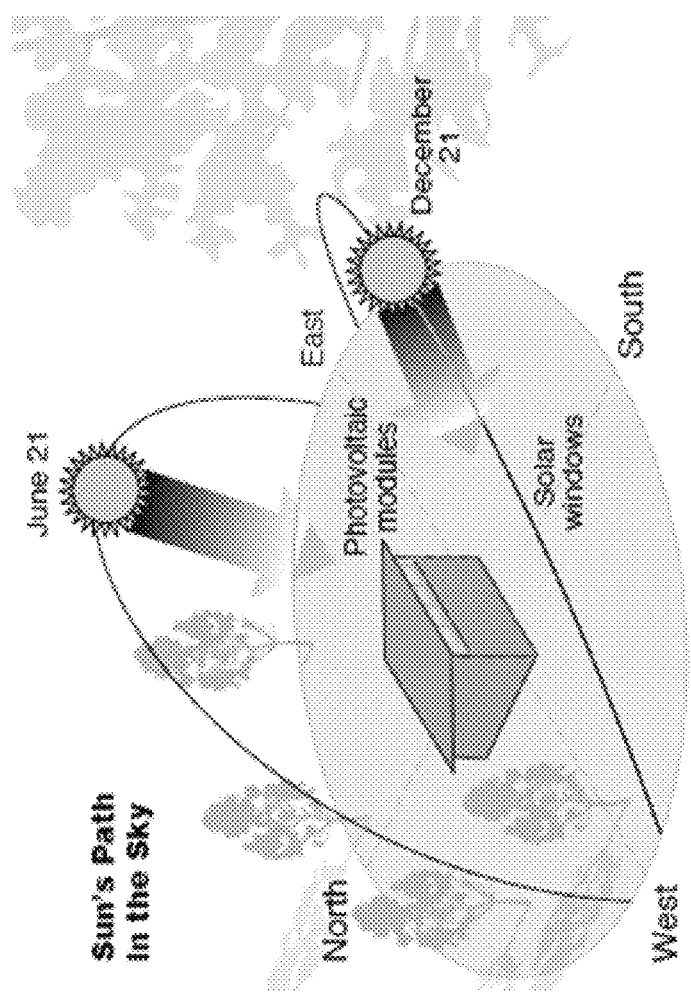
FIG. 5A is a comparison of the impingement of solar radiation on a building façade during summer and winter months at different times of the day and year.

As shown with respect to FIG. 5A, hot desert climates, such as in the Middle Eastern countries Egypt and Saudi Arabia, as well as desert areas of the United States, have very intense sunlight at certain times of the year. Light entering the windows of buildings in these areas provides extreme lighting and heat generation, which varies by time of day and month of year.

Figure 5B:
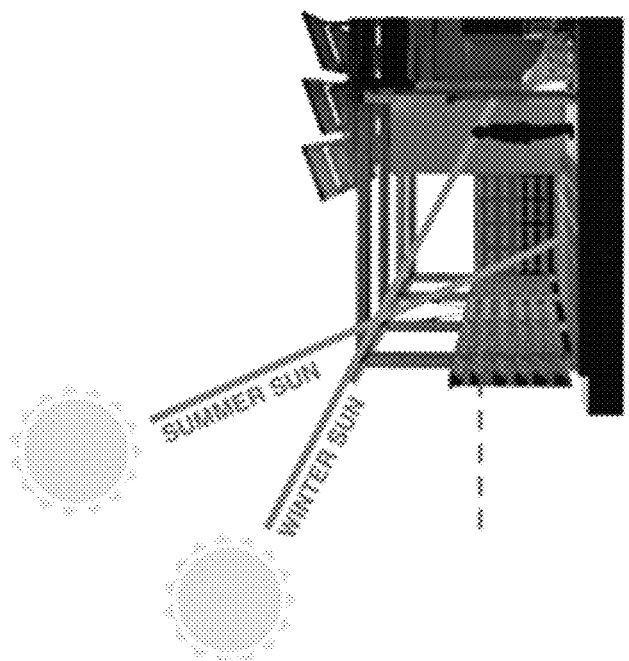
FIG. 5B is a comparison of the angular difference in the impingement of solar radiation on a building façade during summer and winter months.
Figure 5B:
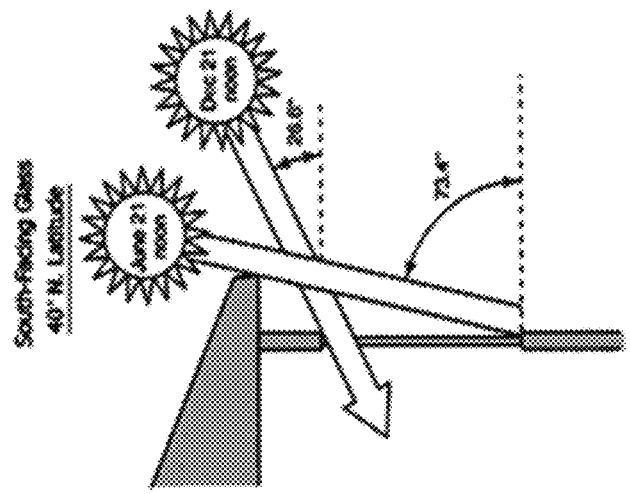

As shown with respect to FIG. 5B, the angle of incidence changes depending on the time of the year. In the example, the angle of incidence is 73.4 degrees at noon in June, but only 26.6 degrees at noon in December. Thus a sun shading sunshade system must be able to self-adjust to provide full shading.

Figure 6:
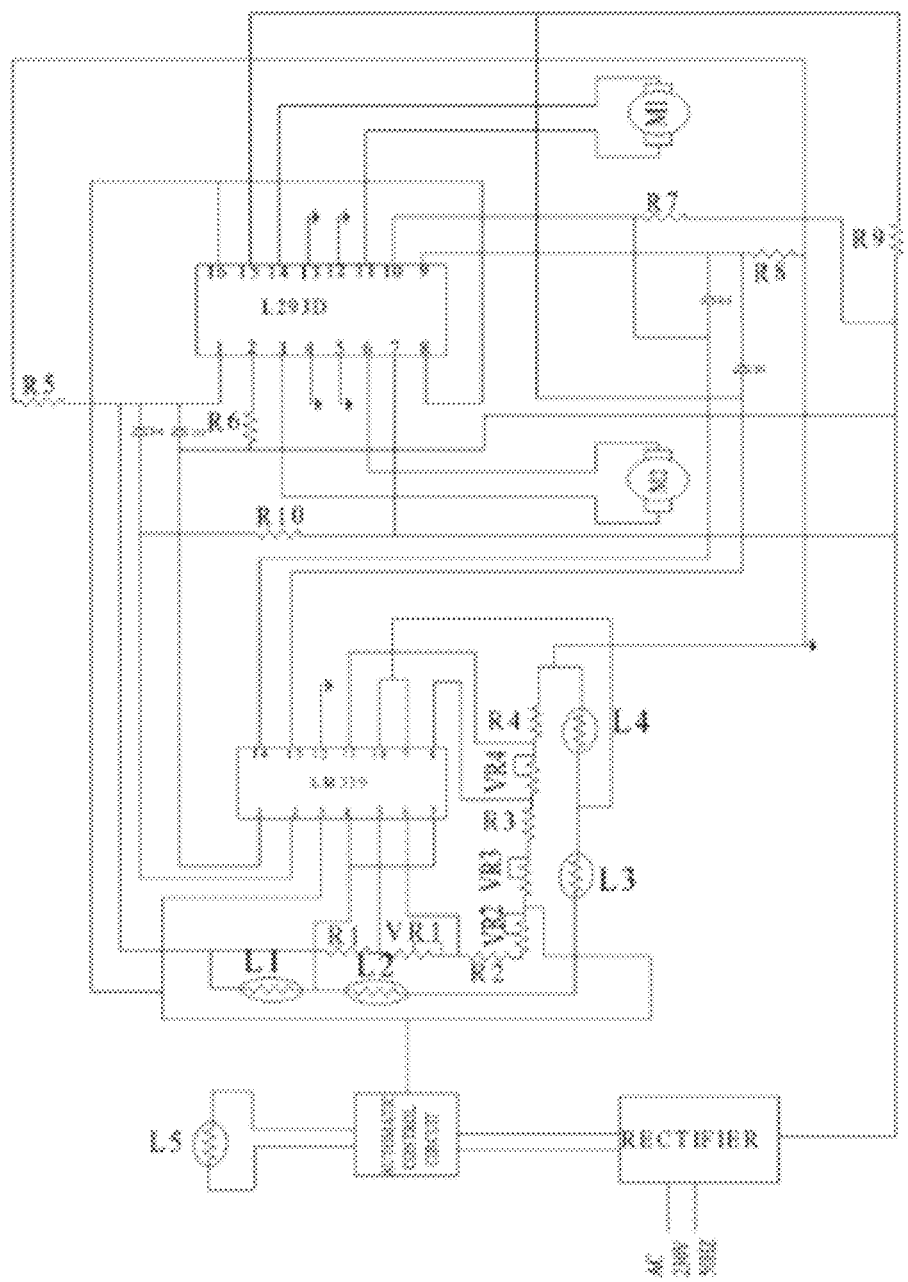
FIG. 6 is an example of an automatic control module used in solar tracking modules having two motors for tracking in the X and Y axis directions.

FIG. 6 shows an automatic control circuit which is used to operate a two motor solar panel known in the prior art, which can be adapted to be used as the control module of the present disclosure.

The control module of the current disclosure further includes a computing device having hardware and software configured to accomplish the controlling described above.

Figure 7:
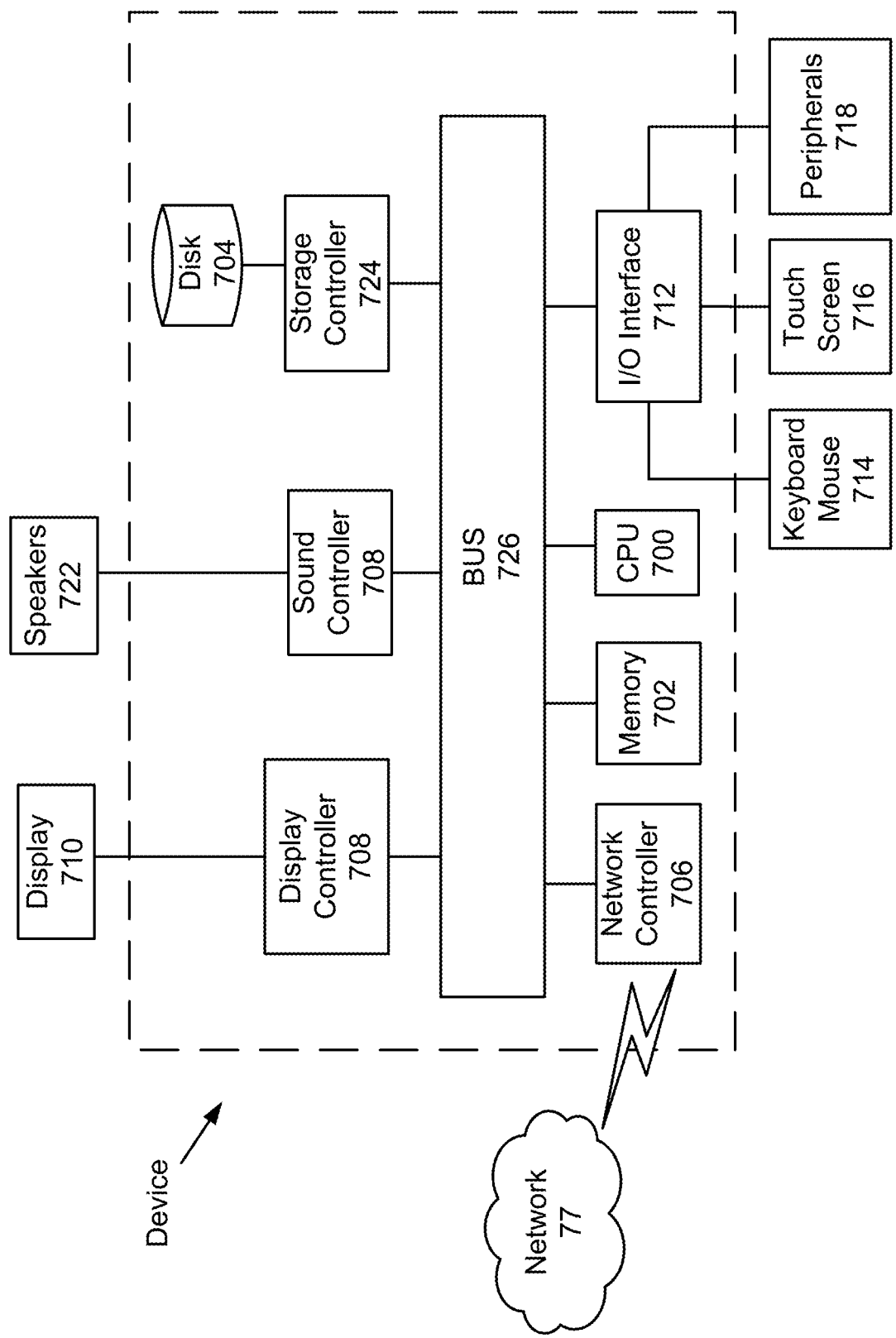
FIG. 7 is an exemplary schematic diagram of the computing device used in the control module, according to certain embodiments.

Next, a hardware description of the computing device according to exemplary embodiments is described with reference to FIG. 7. In FIG. 7, the computing device includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer. Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art. The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
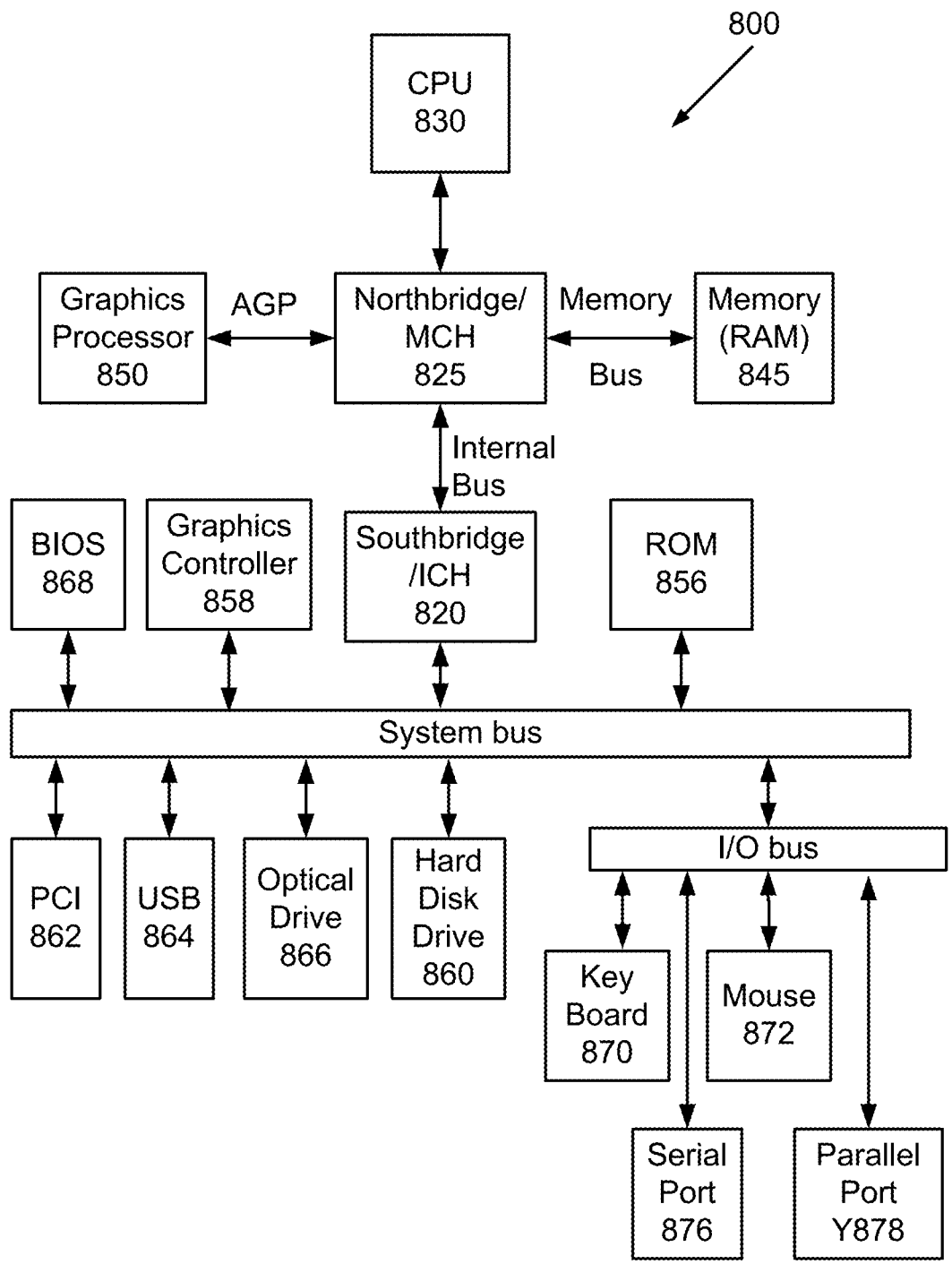
FIG. 8 is an exemplary schematic diagram of a data processing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
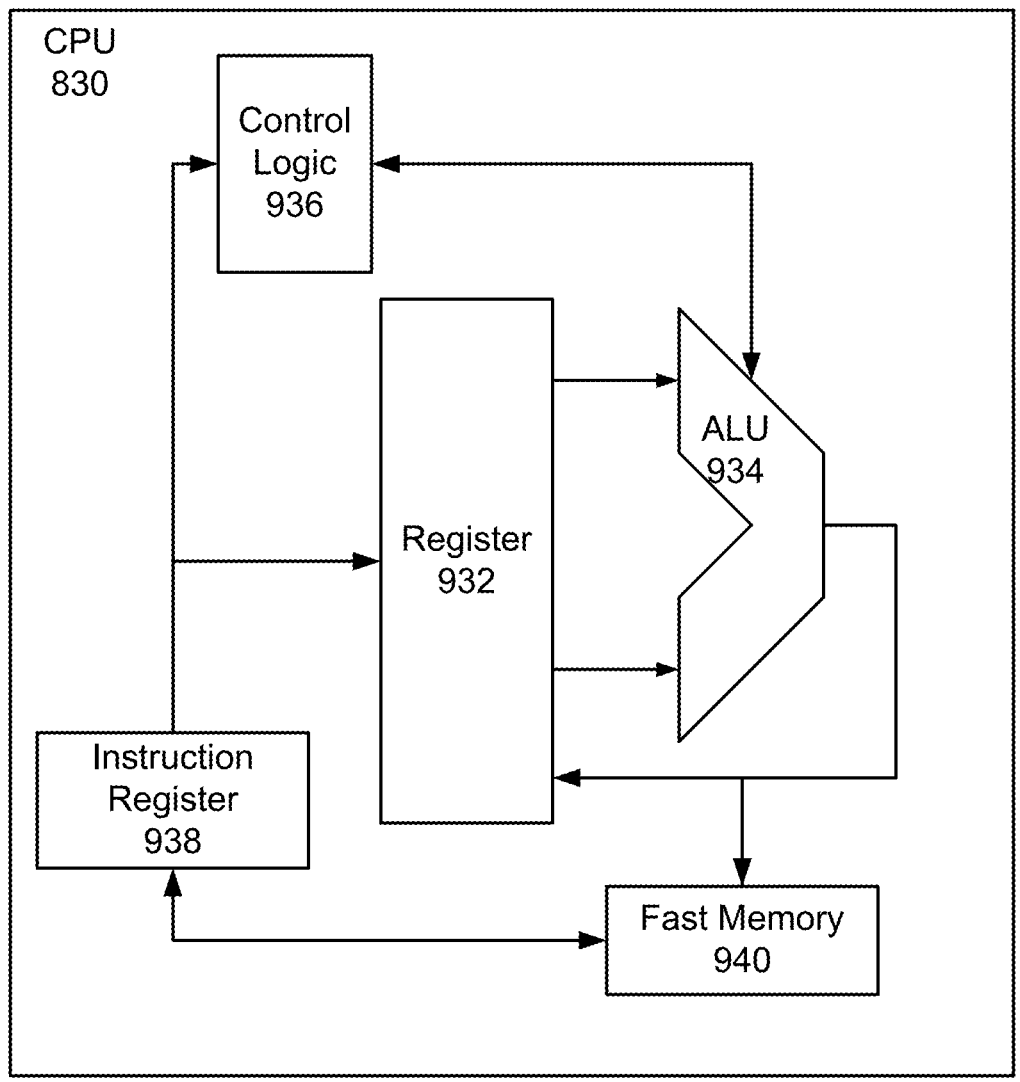
FIG. 9 is an exemplary schematic diagram of a processor, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device. Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A self-powered dynamic photovoltaic sunshade system having a plurality of sunshades, comprising:
at least one sunshade, each sunshade comprising a flat surface constructed of a plastic polymer fabric,
wherein each flat surface constructed of plastic polymer fabric is covered at least partially by at least one thin film of electrically connected photovoltaic cells adhered to the plastic polymer fabric,
wherein each flat surface constructed of the plastic polymer fabric has a first end, a second end, a left edge, a right edge and a first central axis, a length (UL) between the first and second end and a width (W) between the left edge and the right edge;
for each sunshade:
a frame having a first rod perpendicular to the second central axis, the first rod having a left end and a right end, wherein the distance between the left end and the right end equals the width (W) of the plastic polymer fabric;
a second rod perpendicular to the first central axis and parallel to the first rod, the second rod having a left end and a right end, wherein the distance between the left end and the right end equals the width W of the plastic polymer fabric;
a third rod placed parallel to the first central axis, the third rod having a first end and a second end and a length (L), wherein the first end of the third rod is attached to a center of the first rod and extends at least partially through the first rod and wherein the second end of the third rod is attached to the center of the second rod;
a first guy wire having a first wire end and a second wire end, wherein the first wire end is attached to the left end of the first rod, and the second wire end is attached to the left end of the second rod;
a second guy wire having a third wire end and a fourth wire end, wherein the third wire end is attached to the right end of the first rod, and the fourth wire end is attached to the right end of the second rod;
wherein, for each sunshade, the flat surface of the plastic polymer fabric is attached at the first end to the first rod, attached at the second end to the second rod, wherein the plastic polymer fabric is attached along the first central axis to the third rod, attached along the left edge to the first guy wire and attached along the right edge to the second guy wire;

a first metal bar proximate to and parallel to each first rod;
a second metal bar proximate to and parallel to each second rod;
further for each sunshade:
an electric motor having a body and a shaft extending perpendicularly to the body, wherein the electric motor is attached to the first metal bar and the shaft is parallel to the first central axis,
wherein the third rod is connected at the first end to the electric motor shaft;
a hinge connected to the second metal bar, wherein the third rod is connected at the second end to the hinge; and
a first controller operatively connected to the electric motor, the controller including circuitry configured to actuate the electric motor to rotate the shaft bi-directionally through an angle of 180 degrees.

2. The automated photovoltaic sunshade system of claim 1, wherein the plastic polymer fabric is ethylene tetrafluoroethylene fabric, the first rod, the second rod and the third rod are aluminum, and the metal bar is stainless steel.

3. The automated photovoltaic sunshade system of claim 1, wherein the first rod includes a hexagonal washer at the first central axis, the hexagonal washer inserted into the first rod at the first central axis, wherein the shaft of the electric motor is inserted into the hexagonal washer and connects into the first end of the third rod.

4. The automated photovoltaic sunshade system of claim 1, wherein the first metal bar and the second metal bar are affixed to a building façade, and where the at least one sunshade at least partially covers an outside surface of a window in the building façade.

5. The automated photovoltaic sunshade system of claim 1, wherein the plastic polymer fabric is stretched and the at least one thin film of electrically connected photovoltaic cells is adhered to the plastic polymer fabric after the plastic polymer fabric has been stretched and before attachment to the first, second and third rods and the guy wires.

6. The automated photovoltaic sunshade system of claim 1,
wherein the at least one thin film of electrically connected photovoltaic cells generates a current from rays of the sun which impinge upon the photovoltaic cells, and wherein the current from the solar cells is used to power the electric motor to rotate the sunshade.

7. The automated photovoltaic sunshade system of claim 1,
the first rod further comprising a light detector connected to the left end and a second light detector connected to the right end, the light detectors each configured to produce output signals,
wherein each light detector is encased within a transparent housing covered by an ultraviolet light shielding material;
wherein each housing includes a wiper motor having a wiper motor shaft which protrudes from the inside to the outside of a face of the housing which receives the rays of the sun;
wherein a brush is connected to extend perpendicularly to the wiper motor shaft;
wherein the wiper motor includes wiring, the wiring connected to the switch of the electric motor;
a second controller operatively connected to the light detectors, the second controller having circuitry configured to actuate the electric motor to rotate the sunshade based the difference between the output signals of the light detectors and to actuate the wiper motor to cause the brush to wipe the face of the housing.

8. The automated photovoltaic sunshade system of claim 1,
wherein the at least one thin film of electrically connected photovoltaic cells generates current from rays of the sun which impinge upon the photovoltaic cells, and wherein the current from the solar cells is used to charge a storage battery, wherein the storage battery provides energy to power the first controller.

9. The automated photovoltaic sunshade system of claim 4, further comprising a plurality of sunshades installed on the metal bar, wherein the number of sunshades is chosen to completely cover the window when each first rod is parallel to the window.

10. The automated photovoltaic sunshade system of claim 1, the at least one sunshade further comprising a plurality of thin films of electrically connected photovoltaic cells, wherein the plurality of thin films are electrically connected to each other and configured so as to provide a source of electrical current to power the electric motor.

11. The automated photovoltaic sunshade system of claim 8, the first controller further comprising an inverter and a comparator,
wherein the current from the photovoltaic cells charges the battery to a DC voltage level;
wherein the inverter inverts the DC battery voltage to an AC current for powering the controller;
wherein the output signals from the light detectors are received by the first controller and transmitted to the comparator;
wherein the comparator compares the signals from the light detectors and provides a comparison bit to the first controller;
wherein the first controller receives the comparison bit and actuates the electric motor when the difference between the signals is greater than zero.

12. The automated photovoltaic sunshade system of claim 1, wherein the electric motor is a stepper motor and the first controller actuates the electric motor to rotate the shaft in equal step increments.

* * * * *